US005228188A

United States Patent [19]

Badihi et al.

[11] Patent Number: 5,228,188

[45] Date of Patent: Jul. 20, 1993

[54] METHOD OF MAKING THIN FILM SURFACE MOUNT FUSES

[75] Inventors: Avner Badihi, Doar-Na, Israel; Robert W. Franklin, Paignton, England; Barry N. Breen, Givat Ze'ev, Israel

[73] Assignee: AVX Corporation, New York, N.Y.

[21] Appl. No.: 920,113

[22] Filed: Jul. 24, 1992

Related U.S. Application Data

[62] Division of Ser. No. 846,264, Feb. 28, 1992, Pat. No. 5,166,656.

[51] Int. Cl.[5] ...................... H01H 69/02; B23P 17/00

[52] U.S. Cl. ........................................ 29/623; 29/621; 29/412

[58] Field of Search ......................... 29/623, 621, 412; 337/227, 228, 232, 297

[56] References Cited

U.S. PATENT DOCUMENTS

| | | | |
|---|---|---|---|
| 2,864,917 | 12/1958 | Sundt . | |
| 2,934,627 | 4/1960 | Bristol et al. . | |
| 3,585,556 | 6/1971 | Himgoramy et al. | 337/297 |
| 3,898,603 | 8/1975 | Cricchi et al. | 337/297 |
| 3,978,443 | 8/1976 | Dennis et al. | 337/297 |
| 4,031,497 | 6/1977 | Ozawa | 337/297 |
| 4,140,988 | 2/1979 | Oakes | 337/297 |
| 4,208,645 | 6/1980 | Harmon et al. | 337/297 |
| 4,272,753 | 6/1981 | Nicolay | 337/297 |
| 4,342,977 | 8/1982 | McGalliard | 337/297 |
| 4,453,199 | 6/1984 | Ritchie et al. | 29/25.42 |
| 4,486,738 | 12/1984 | Sadzo et al. | 29/412 |
| 4,757,423 | 7/1988 | Franklin | 337/232 |
| 4,788,523 | 11/1988 | Robbins | 29/621 |
| 5,027,101 | 6/1991 | Morrill, Jr. | 337/297 |
| 5,032,817 | 7/1991 | Morrill, Jr. et al. | 337/297 |

*Primary Examiner*—P. W. Echols

*Attorney, Agent, or Firm*—Spensley, Horn, Jubas & Lubitz

[57] ABSTRACT

SMD fuses having consistent operating characteristics are fabricated by forming a repeating lithographic fuse element pattern on an insulative substrate, passivating the structure, bonding a protective glass plate over the passivation layer, slicing the assembly so formed, terminating the slices and cutting the slices into individual fuses. Fuses thus manufactured may be of any desired dimensions, including standard and non-standard chip sizes.

5 Claims, 4 Drawing Sheets

METHOD OF MAKING THIN FILM SURFACE MOUNT FUSES

This is a divisional of application Ser. No. 07/846,264 filed on Feb. 28, 1992 now U.S. Pat. No. 5,166,656.

FIELD OF THE INVENTION

The present invention relates generally to electrical fuses and particularly to surface mount fuses employing thin film technology.

BACKGROUND OF THE INVENTION

Surface mounting has become the preferred technique for circuit board assembly and virtually all types of electronic components have been or are being redesigned for surface mount, that is, leadless, applications. The rapid incorporation of surface mount devices (SMD) into all types of electronic circuits has created a demand for SMD fuses.

Fuses serve an essential function on many circuit boards. By fusing selected sub-circuits and even certain individual components it is possible to prevent damage to an entire system which may result from failure of a local component. For example, fire damage to a mainframe computer can result from the failure of a tantalum capacitor; a short in a single line card might disable an entire telephone exchange.

The required characteristics for circuit board fuses are small size, low cost, accurate current-sensing, very fast reaction or blow time and the ability, in the case of time lag fuses, to provide surge resistance.

Existing tube type or leaded fuses take up excessive space on circuit boards designed for SMD assembly and add significantly to production costs. Recognizing the need for fuses compatible with SMD assembly techniques, several manufacturers offer leadless, molded fuses for standard SMD assembly. The devices provided by this approach, however, remain bulky (for example, package sizes of about 7×4×3 mm), expensive and of limited performance range. Most importantly, the characteristics of fuses of the prior art cannot be accurately controlled during manufacture.

SUMMARY OF THE INVENTION

It has been found that thin film technology provides a high level of control of all fuse parameters, thus making possible economical standard and custom fuse designs meeting a wide range of fusing requirements. Thus, thin film technology enables the development of fuses in which both electrical and physical properties can be tightly controlled. The advantages of the technology are particularly evident in the areas of physical design, repeatability of fusing characteristics and $I^2t$ "let-through". Moreover, because present techniques allow line width resolution below 1 μm and control of layer thickness to 100 Å, the fabrication of true miniature SMD fuses having standard (for example, 1.6×0.8 mm) and non-standard package sizes are made possible.

In accordance with one specific example of the present invention, there is provided a method of manufacturing a thin film surface mount electrical fuse in which, first, a uniform thin metal film of aluminum is deposited by sputtering or the like on a surface of an insulating substrate. The thickness of the film is dependent upon, among other things, the fuse rating. Selected portions of the thin metal film are then removed by photolithographic techniques to define a repetitive pattern comprising a plurality of identical fuse elements each comprising a pair of contact portions interconnected by a fusible link having a width smaller than that of the contact portions. The structure is then passivated and an insulating cover plate of glass is bonded by epoxy over the passivation layer. The assembly formed by the preceding steps is next cut into strips along end planes normal to the surface of the substrate, each strip including a series of side-by-side fuses. This cutting step exposes edges of the contact portions of each fuse element along the end planes of the strips. Conductive termination layers are deposited over the end planes thereby electrically connecting the terminations to the exposed edges of the contact portions. Last, the strips are cut transversely into individual fuses.

The photolithographic production method allows a great variety of fuse element designs and substrate types to be combined for creating a wide range of fuse chips. Moreover, critical parameters such as fuse speed can be programmed to optimally satisfy application requirements. Finally, the hermetic structure of the thin film fuse provided by the sealing glass cover plate imparts excellent environmental reliability.

In accordance with other aspects of the invention, the passivation layer may comprise chemically vapor deposited silica or, for improved yield and lower cost, a thick layer of printed glass. The terminations preferably comprise solder coated metal layers extending around corners bounding the end planes of the fuse to form mounting lands. Alternatively, each termination may comprise a coating of low melting point metal or alloy over a layer of a highly conductive metal such as silver or copper. When the temperature of the fuse exceeds a predetermined level, the conductive layer dissolves in the low melting point metal or alloy. Because the molten layer does not wet glass, discontinuities appear in the layer thereby breaking the electrical connection between the termination and the fuse element. In this fashion, both electrical and thermal fusing mechanisms are provided.

BRIEF DESCRIPTION OF THE DRAWINGS

Further objects, features and advantages of the present invention will become apparent from the detailed description of the preferred embodiments, below, when read in conjunction with the accompanying drawings in which.

DETAILED DESCRIPTION OF THE PREFERRED EMBODIMENTS

Figure 1:
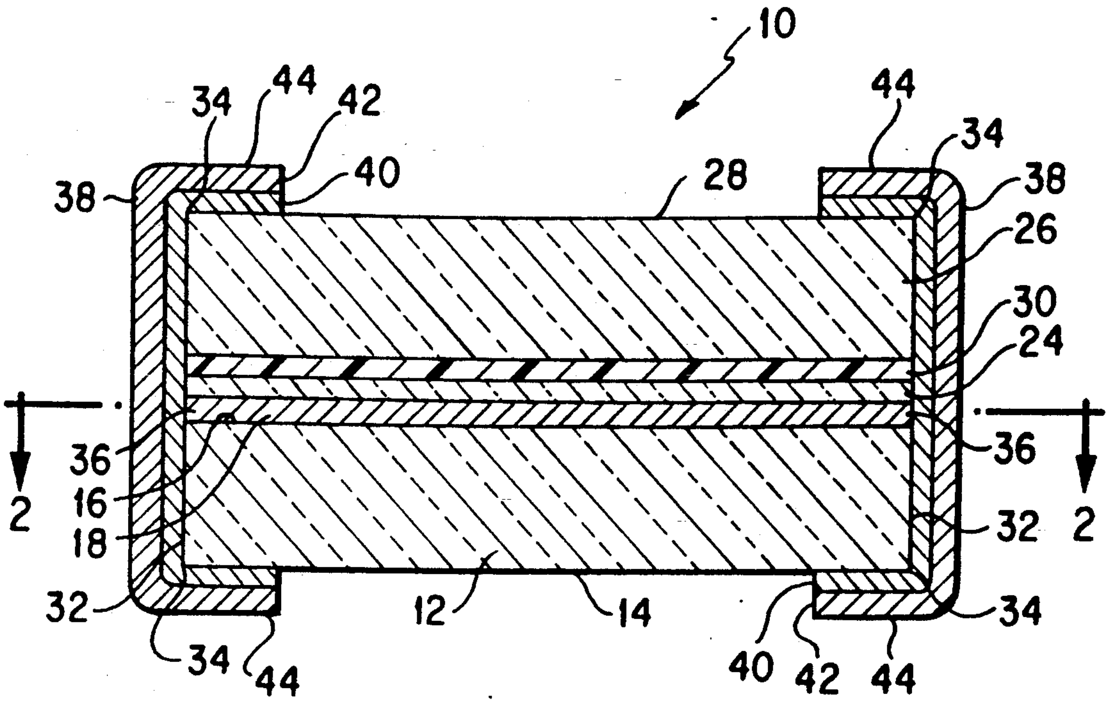
FIG. 1 is a side elevation view, in cross section, of a fuse in accordance with the present invention.
Figure 2:
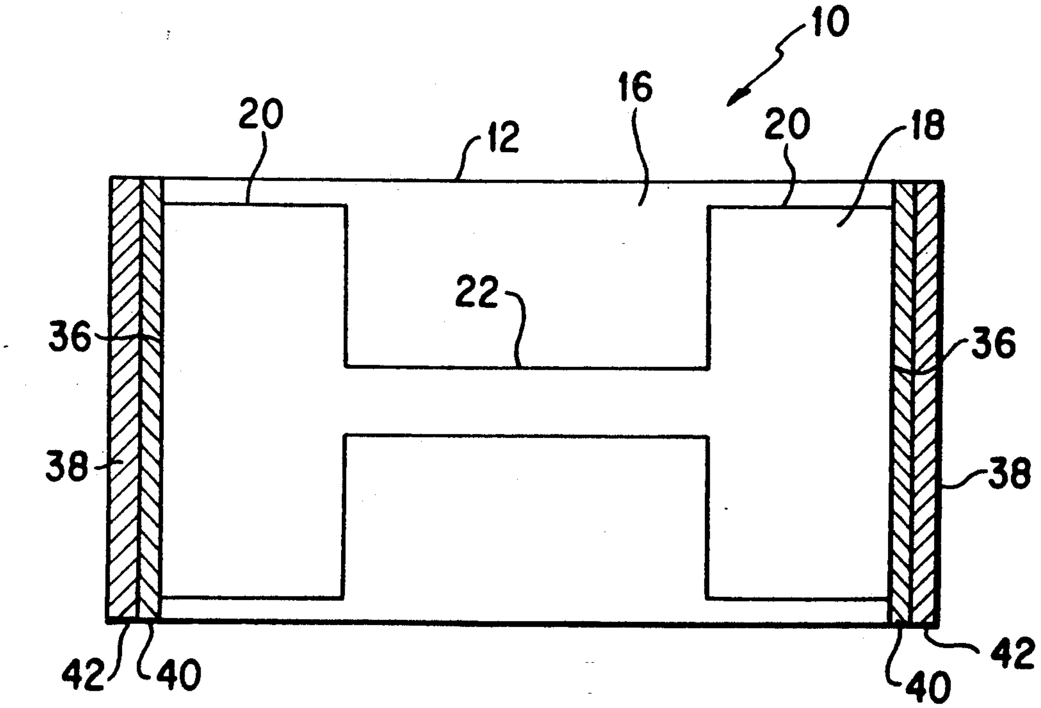
FIG. 2 is a cross section view of the fuse of FIG. 1 as seen along the line 2—2.
Figure 3:
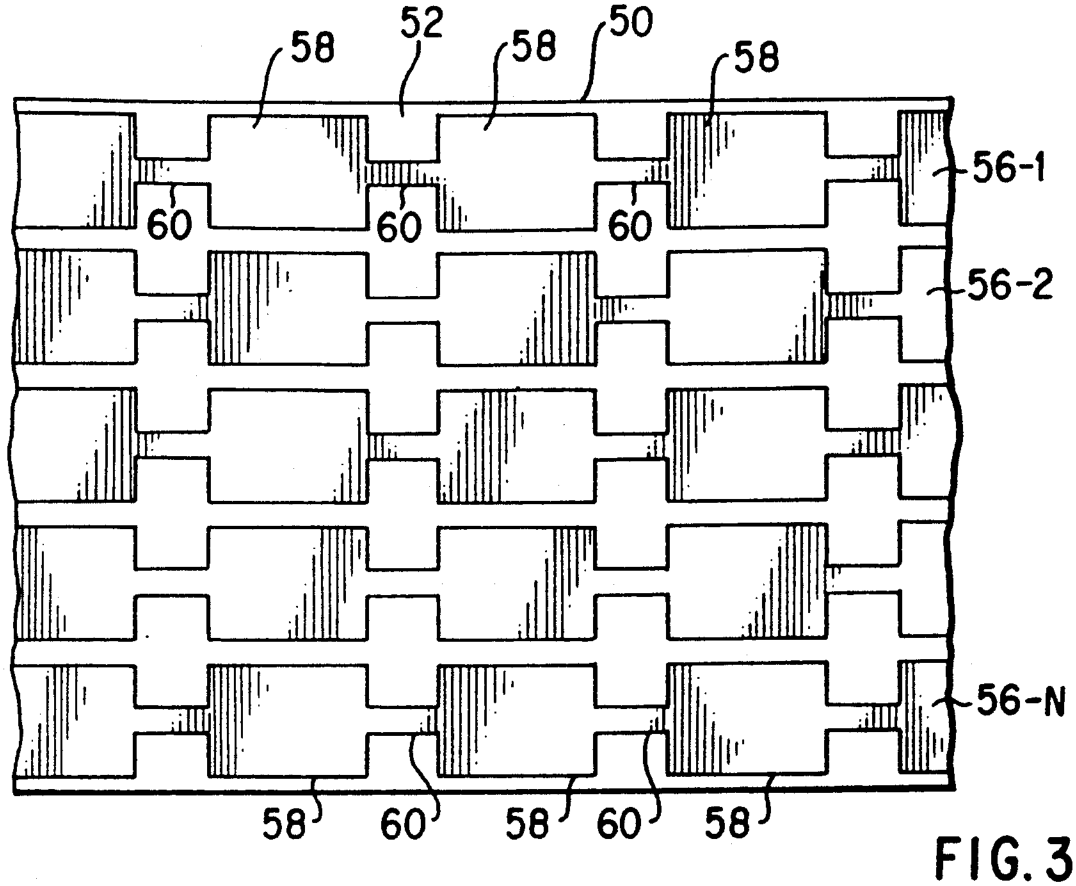
FIGS. 3 and 4 are top plan views of a treated substrate illustrating stages of manufacture of fuses in accordance with the invention.
Figure 4:
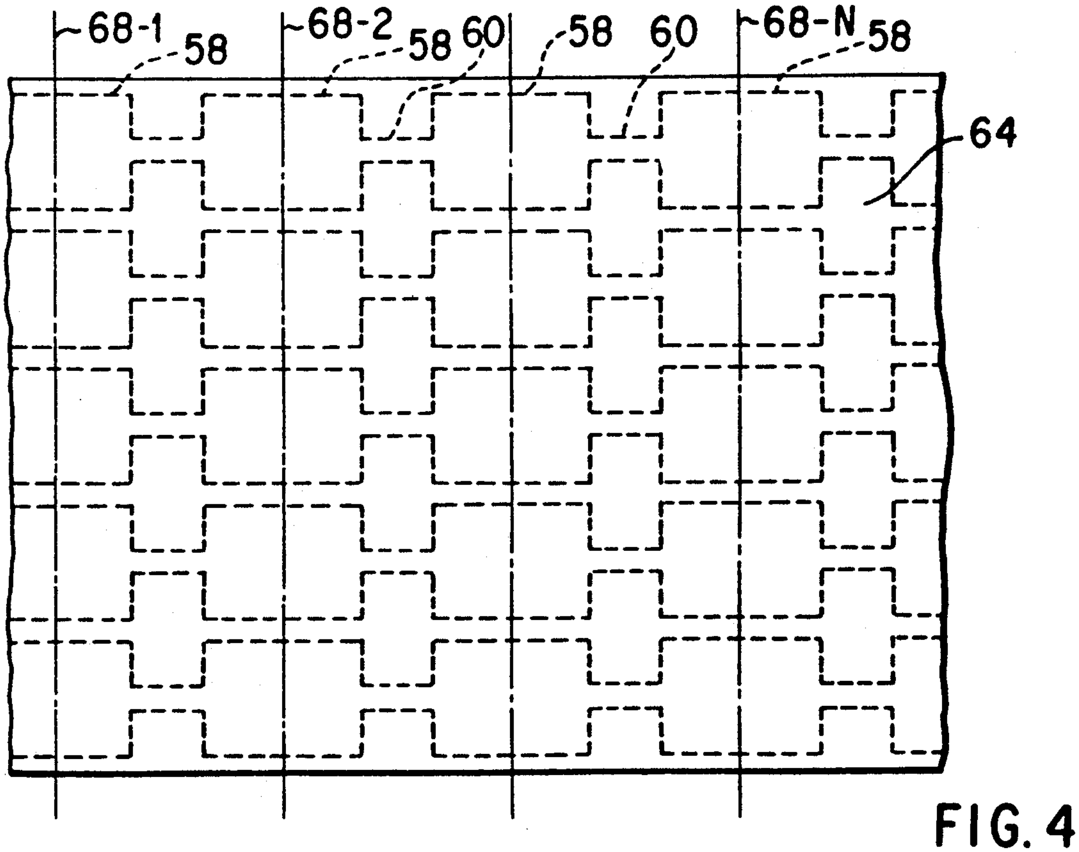

FIGS. 1 and 2 show a thin film SMD fuse 10 in accordance with a preferred embodiment of the invention. (It will be evident that the thicknesses of the various layers of the structure shown in the drawings have been greatly exaggerated for clarity.)

The fuse 10 includes a substrate 12, preferably a glass plate having a thickness, for example, of about 20–30 mils. The substrate has a lower surface 14 and an upper planar surface 16 coated with a thin film of metal, such as aluminum, configured to define one or more fuse elements 18. By way of example, the metallic film may have a thickness ranging from 0.6 or less to 4.5 μm or more. The fuse element 18 comprises a pair of contact portions 20 interconnected by a fusible link 22 having a width substantially smaller than that of the contact portions 20. By way of example, a fuse element having a 0.2 amp rating may have an overall length of 116 mils, a width of 51 mils and a fusible link having a length of 10 mils and a width of 1 mil. The thickness of the thin film for such a fuse may be 0.6 microns.

Protecting the thin film fuse element 18 and the surrounding portions of the upper surface 16 of the substrate 12 is a silica passivation layer 24. A glass cover 26 coextensive with the substrate 12 and having an upper surface 28, is bonded to the passivation layer 24 by an epoxy layer 30 which also serves to seal the fuse element.

The fuse assembly so far described is preferably in the form of a rectangular prism having parallel end planes 32 and end corners 34 bounding the end planes. End edges 36 of the fuse element contact portions 20 lie in the end planes 32.

Covering the planar end surfaces 32 are conductive terminations 38 each composed of an inner layer 40 of nickel, chromium or the like, and an outer solder coating 42. The inner layer is in contact with an end edge 36 of one of the contact portions 20 to provide an electrical connection between the terminations 38 and the opposed ends of the fuse element 18.

The terminations 38 include lands 44 extending around the corners 34 and along portions of the upper surface of the glass cover 28 and lower surface of the substrate 14.

In place of the silica passivation layer 24, a thick layer, for example, 0.5 to 4 mils, of printed glass may be used instead. The application of printed glass is less expensive than, for example, chemical vapor deposition, and provides substantially improved yield, and therefore lower production costs. Furthermore, printed glass significantly improves fuse voltage performance. For example, whereas a silica passivated fuse might be rated at 20 volts, a 32 volt rating and even higher can be achieved with a printed glass passivated fuse.

As another alternative to the structure thus far described, which alternative provides a thermal fusing mechanism, the inner layer 40 of each termination 38 may be composed of a thin deposit of copper or silver, or similar high conductivity metal, which may be applied by known techniques such as evaporation of sputtering. Such metals normally do not wet glass and so cannot be applied by dipping glass into molten metal. Accordingly, pursuant to the alternative structure, the outer coating 42 over the copper or silver deposit 40 is composed of a layer of a low melting point metal or alloy such as tin or tin/lead somewhat thicker than the copper or silver deposit. The tin or tin/lead layer wets the copper or silver but does not wet glass. When the temperature of the fuse rises to the melting point of the low melting point layer 42, for example, to 300° C., the copper or silver is leached, that is, dissolved in the molten layer 42. As the molten layer 42 does not wet the glass, it cannot stay in intimate contact with the glass and instead forms balls of liquid metal. In particular, discontinuities in the layer occur at sharp corners such as the corners 34. Thus, electrical continuity is broken between the lands 44 and the fuse element 18. In accordance with this alternative, the fuse has two fusing mechanisms, one electrical and the other thermal, the thin film fuse element 18 providing electrical protection while the leachable end termination 38 provides thermal protection.

The thin film fuse of the invention is highly reliable. The protective cover plate is temperature stable and hermetic, thereby protecting the fuse element 18 when the fuse is exposed to high temperature and humidity environments. The protective cover 26 is also electrically stable even under the extreme conditions which exist during fuse actuation. High insulation resistance ($>1M\Omega$) is consistently maintained after fuse actuation, even at circuit voltages of 125 V (50A maximum breaking current).

Referring now to FIGS. 3–6, there are shown several stages of a preferred method of manufacturing the SMD fuses of the invention. A substrate 50 comprising, for example, a 4-inch by 4-inch square glass plate having a thickness of about 20 mils, has upper and lower surfaces 52 and 54, respectively. A conductive material, preferably aluminum, is deposited, for example, by sputtering, on the upper surface 52 to form a uniform thin film having a thickness ranging, as already mentioned, from less than 0.6 microns to 4.5 microns or more, depending upon the rating of the fuse and other factors.

The conductive layer is patterned with a standard photoresist cover coat and is photoetched to define continuous, parallel rows 56-1, 56-2, . . . 56-N of alternating wide and narrow areas 58 and 60, respectively, which in the final products will form the contact portions and interconnecting fusible links of the fuse. There may be thousands of these repeating element patterns on a single substrate only a small portion of which is shown.

Applied over the patterned conductive thin film and surrounding upper surface 52 of the substrate is a passivation layer 62 of chemically vapor deposited silica or printed glass. Next, a glass cover 64, coextensive with the substrate, is secured over the passivation layer by means of a coating 66 of epoxy or like bonding and sealing agent.

Figure 5:
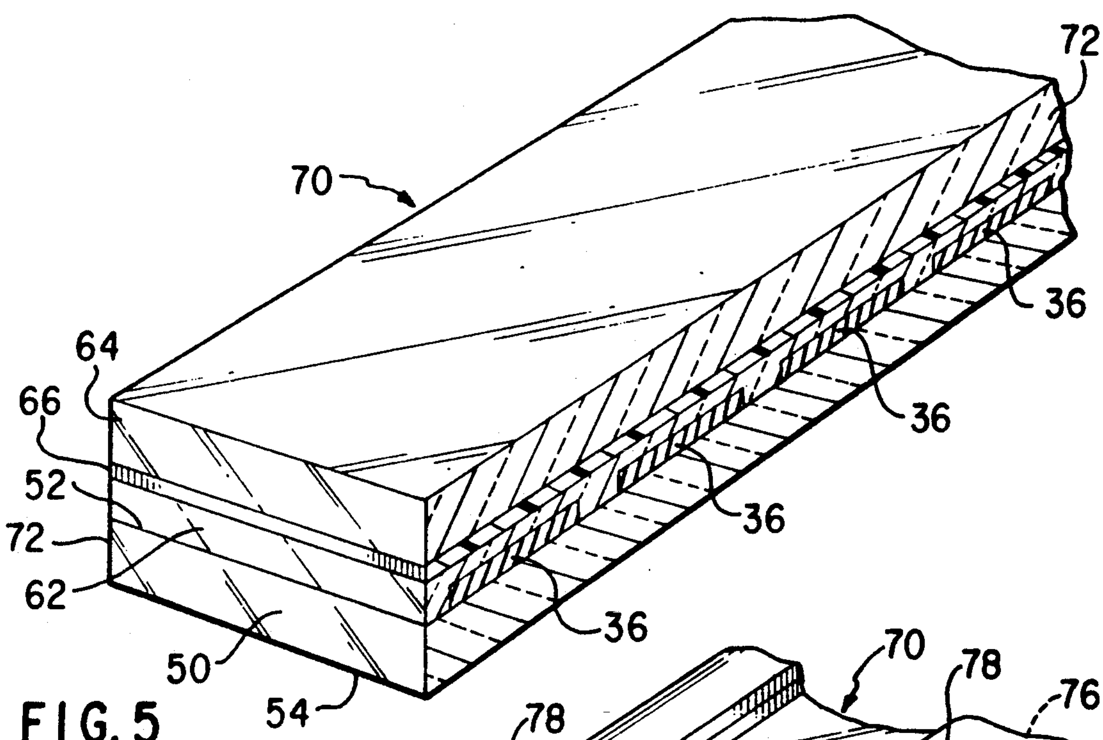
FIG. 5 is a perspective view of a composite, multilayer strip including multiple fuses, illustrating another stage in the manufacture of the fuses.

The composite, multilayer fuse assembly thus formed is cut by a diamond saw or the like along parallel planes 68-1, 68-2, . . . 68-N (FIG. 4) perpendicular to the layers of the assembly and to the fuse element rows and so positioned as to bisect the wide areas 58 of the thin film patterns. The result is a series of strips an example 70 of which is shown in FIG. 5. It will be seen that the cutting operation exposes the end edges 36 of the contact portions of adjacent fuse elements along end planar surfaces 72.

Figure 6:
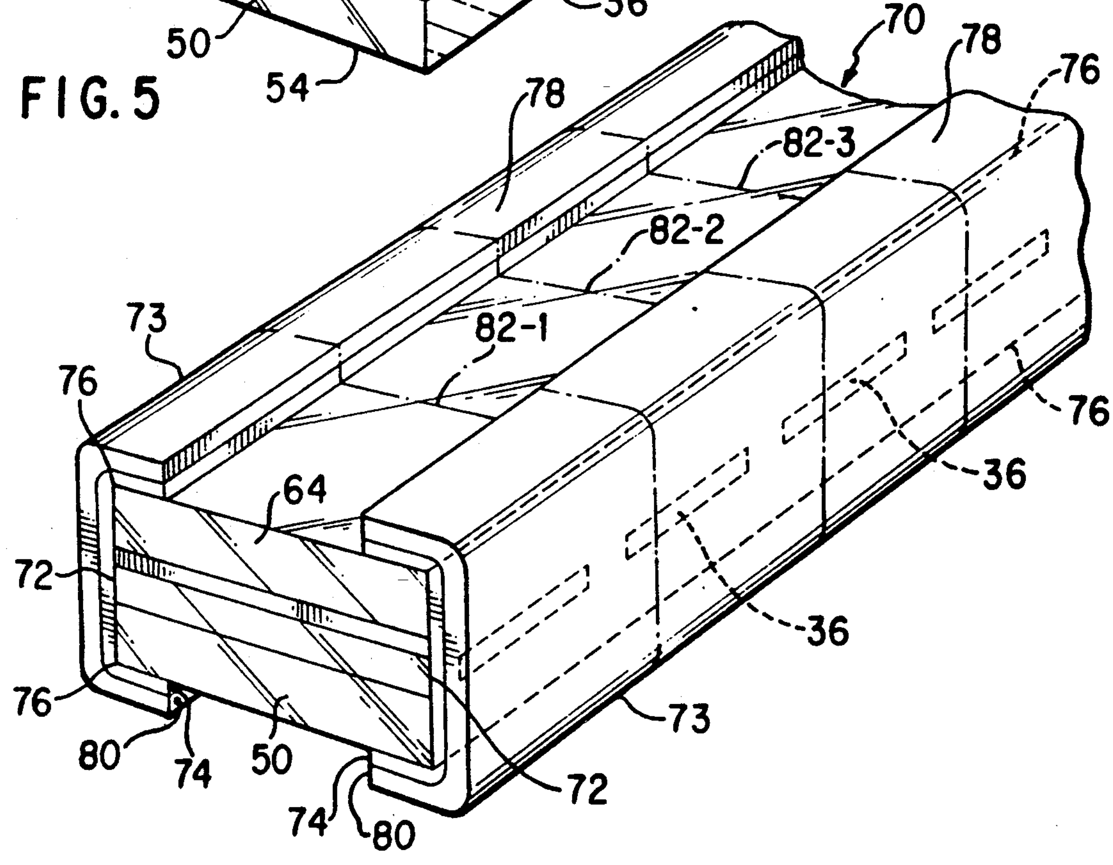
FIG. 6 is a perspective view of the strip of FIG. 5 following the application of termination layers including a solder coating.

With reference to FIG. 6, electrical terminations 73 are applied to the strip 70 by vapor depositing or sputtering a layer 74 of nickel or copper to fully cover the opposed planar surfaces 72 of the strip, including the end edges 36 of the fuse elements to thereby establish electrical continuity between the contact portions of the fuse and the nickel or copper termination layer 74. As already noted, the conductive layer is applied so as to extend around the corners 76 of the strip and along portions of the upper and lower surfaces of the strip to form lands 78. The layer 74 is coated with a solder layer 80.

Last, the strips 70 are cut transversely along parallel planes 82-1, 82-2, 82-3, etc., into individual fuses like that shown in FIGS. 1 and 2.

Figure 7:
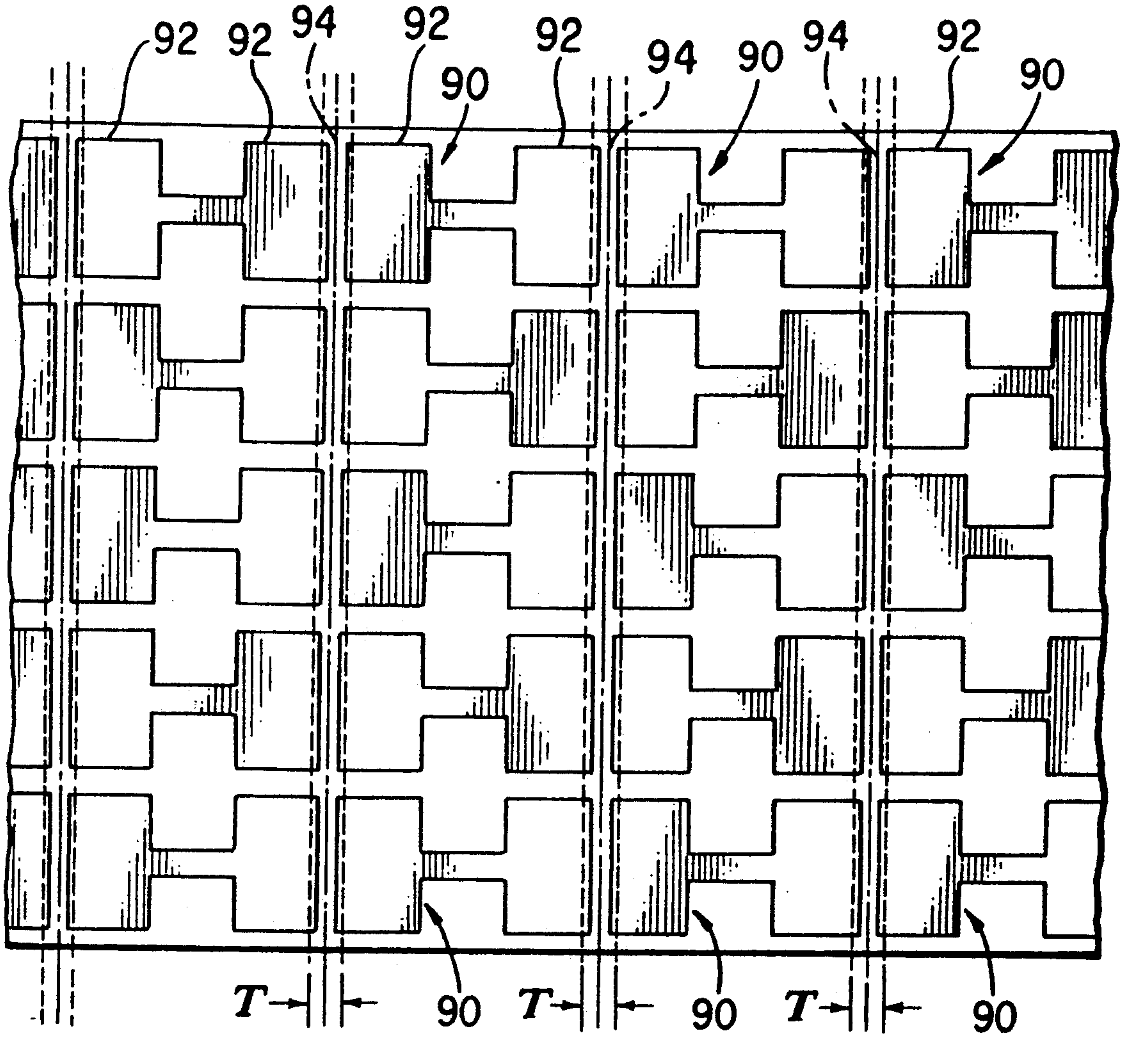
FIG. 7 is a top plan view of a treated substrate illustrating a stage of fabrication in accordance with an alternative method of manufacture.

A further alternative method of fabricating the fuses of the present invention is illustrated in FIG. 7. In this embodiment, instead of continuous rows of connected fuse elements as in FIG. 3, individual fuse elements 90 whose contact portions 92 are separated by spaces 94, are defined by the photoresist process. The width of the spaces 94 separating the individual fuse elements is smaller than the thickness, T, of the cutting blade used to separate the assembly into strips. Accordingly, the cutting blade intercepts the margins of the contact portions 92 so as to assure that end edges of the contact portions are exposed along the cutting planes. All of the other steps of the fabrication method are as previously described.

Pursuant to the invention, the ability to define or program very accurately the width, length, thickness and conductivity of the fuse element results in minimal variability in fuse characteristics. Further, a large variety of fuse element designs and substrate types can be combined to create fuses having a range of speed characteristics. For example, fast fuses can be produced by using a low mass fuse element on a thermally isolated substrate, while slower fuse characteristics can be obtained from a combination of a high mass fuse element and a thermally conductive substrate.

What is claimed is:

1. A method of manufacturing a surface mount electrical fuse, comprising the steps of:

applying a thin metal film to a surface of an insulating substrate;

removing selected portions of the thin metal film to define a repetitive pattern comprising continuous rows of identical fuse elements, each fuse element comprising a pair of contact portions interconnected by at least one fusible link having a width smaller than that of the contact portions;

passivating the thin metal film and the adjacent surface of the substrate;

bonding an insulating cover to the passivation layer formed by the preceding step;

cutting the assembly formed by the preceding steps into strips along planes normal to the surface of the substrate, each strip thereby including opposed end planar surfaces formed by the cutting operation and a series of side-by-side fuses extending between the end surfaces, and an edge of one of the contact portions of each fuse element being thereby exposed at each of said end surfaces;

applying a conductive termination over each end surface thereby electrically connecting each termination to the edges of the contact portions exposed at the end surface; and cutting the strips into individual fuses.

2. A method of manufacturing a surface mount fuse, as defined in claim 1, in which the application of the terminations includes the steps of:

applying a conductive layer to each end surface; and coating the conductive layer with solder.

3. A method of manufacturing a surface mount fuse, as defined in claim 1, in which the strips include corners bounding the end planar surfaces and which includes the step of:

applying the termination to extend around said corners.

4. A method of manufacturing a surface mount fuse, as defined in claim 3, in which the substrate and cover are glass and in which the application of the terminations includes the steps of:

depositing on each end planar surface a highly conductive metallic layer; and depositing over said layer a low melting point metallic layer, said low melting point metal wetting said first mentioned layer but not said glass layers, whereby when the temperature of the fuse during use thereof rises to the melting point of the low melting point metal, the first mentioned layer dissolves in the low melting point metal causing electrical discontinuities to occur in the termination.

5. A method of manufacturing a surface mount electrical fuse comprising the steps of:

depositing a thin conductive film on a surface of an insulating substrate;

removing selected portions of said film to define parallel rows of plural fuse elements, each of said fuse elements comprising a pair of contact portions interconnected by at least one fusible link having a width smaller than that of the contact portions, the fuse elements of each row being disposed end to end in spaced apart relationship;

applying a passivation layer to the thin film and surrounding surface of the substrate;

adhesively bonding an insulating cover to the passivation layer;

cutting the layered assembly formed by the preceding steps along parallel planes mutually perpendicular to the direction of said rows and to the thin film to define planar surfaces intersecting the contact portions of adjacent fuses, thereby forming strips of fuses disposed side-by-side and exposing edges of the contact portions;

depositing a conductive termination layer over each of the planar surfaces formed by the preceding step thereby electrically connecting the exposed contact portion edges to the termination layer; and cutting the strips of fuses into individual fuses.

* * * * *